(12) United States Patent
Crean

(10) Patent No.: US 7,334,827 B1
(45) Date of Patent: Feb. 26, 2008

(54) SLIDE-OUT GLIDING SYSTEM FOR RECREATIONAL VEHICLES

(75) Inventor: Johnnie R. Crean, Chino, CA (US)

(73) Assignee: Alfa Leisure, Inc., Ontario, CA (US)

( * ) Notice: Subject to any disclaimer, the term of this patent is extended or adjusted under 35 U.S.C. 154(b) by 199 days.

(21) Appl. No.: 11/336,624

(22) Filed: Jan. 19, 2006

Related U.S. Application Data

(60) Provisional application No. 60/645,300, filed on Jan. 19, 2005, provisional application No. 60/645,332, filed on Jan. 19, 2005.

(51) Int. Cl.
*B60P 3/34* (2006.01)
(52) U.S. Cl. .................. 296/26.13; 296/26.01
(58) Field of Classification Search ............ 296/26.01, 296/26.12, 26.13
See application file for complete search history.

(56) References Cited

U.S. PATENT DOCUMENTS

| | | | |
|---|---|---|---|
| 6,619,713 B2* | 9/2003 | Eichhorn ................. | 296/26.01 |
| 6,644,719 B2* | 11/2003 | Young, Sr. .................. | 296/165 |
| 2002/0074815 A1* | 6/2002 | McManus et al. ....... | 296/26.01 |
| 2002/0084661 A1* | 7/2002 | McManus et al. ....... | 296/26.01 |
| 2004/0174031 A1* | 9/2004 | Rasmussen ............. | 296/26.01 |

\* cited by examiner

*Primary Examiner*—Lori L. Lyjak
(74) *Attorney, Agent, or Firm*—Knobbe, Martens, Olson & Bear, LLP

(57) ABSTRACT

The present teachings describe a method and system for deploying and retracting recreational vehicle slide-outs. The recreational vehicle includes a vertical movement member positioned in a recessed region formed in an exterior wall of the recreational vehicle so as to be adjacent the lower portion of an opening formed therein. At least a portion of the floor of the slide-out glides along the vertical movement member during retraction so as to lift the slide-out housing to the second level and glides along the vertical movement member during deployment so as to lower the slide-out housing to the third level.

12 Claims, 16 Drawing Sheets

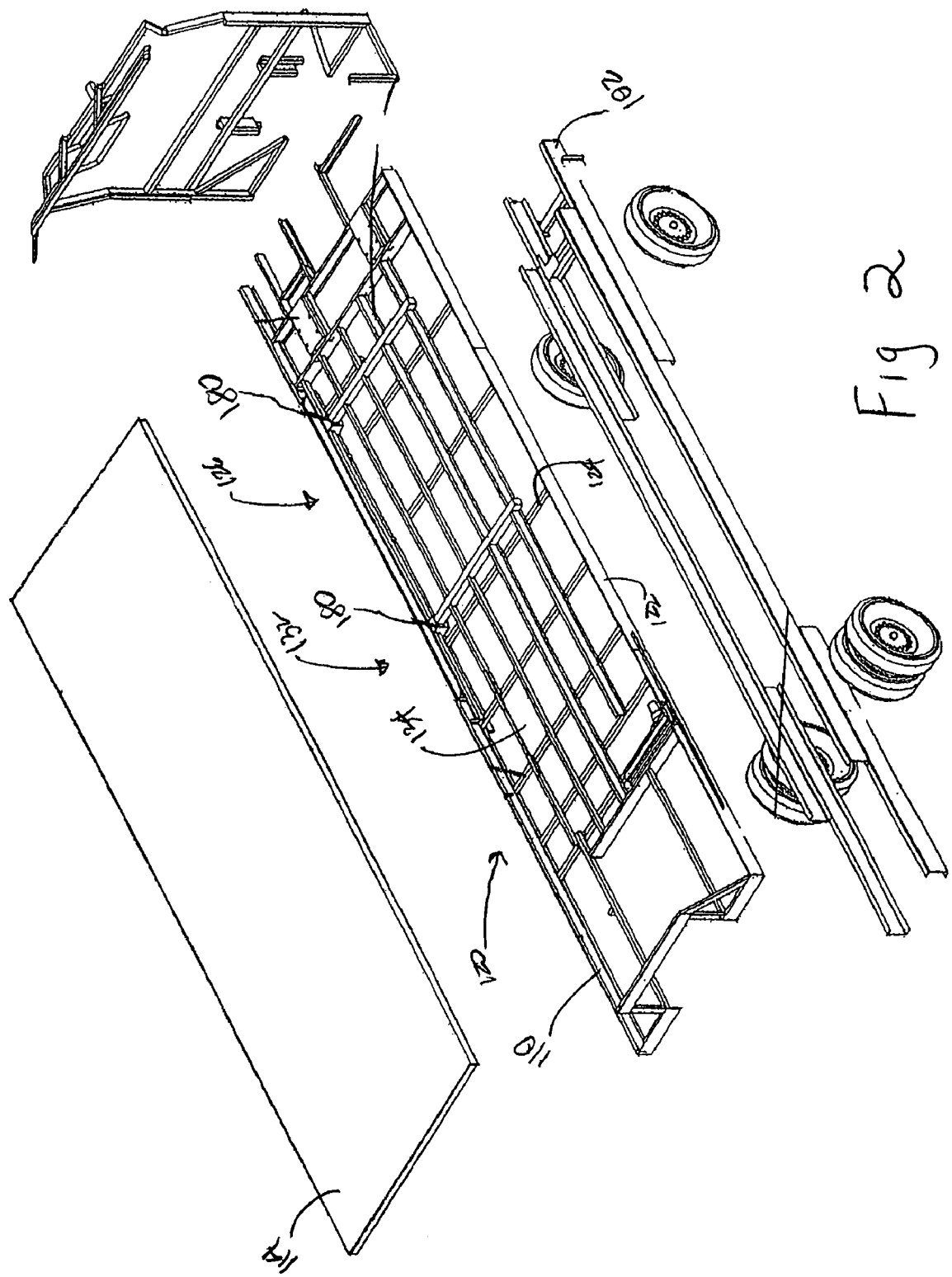

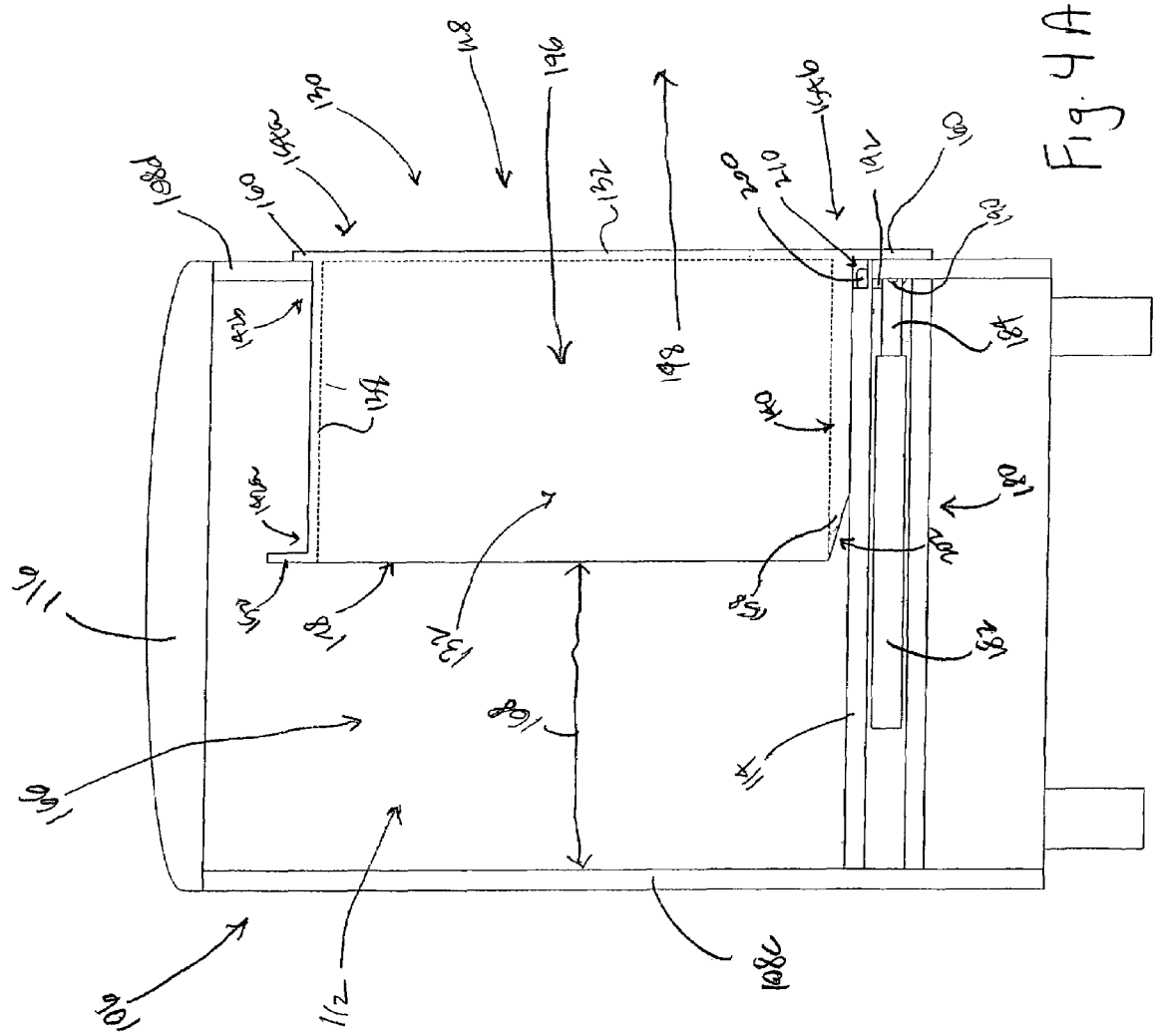

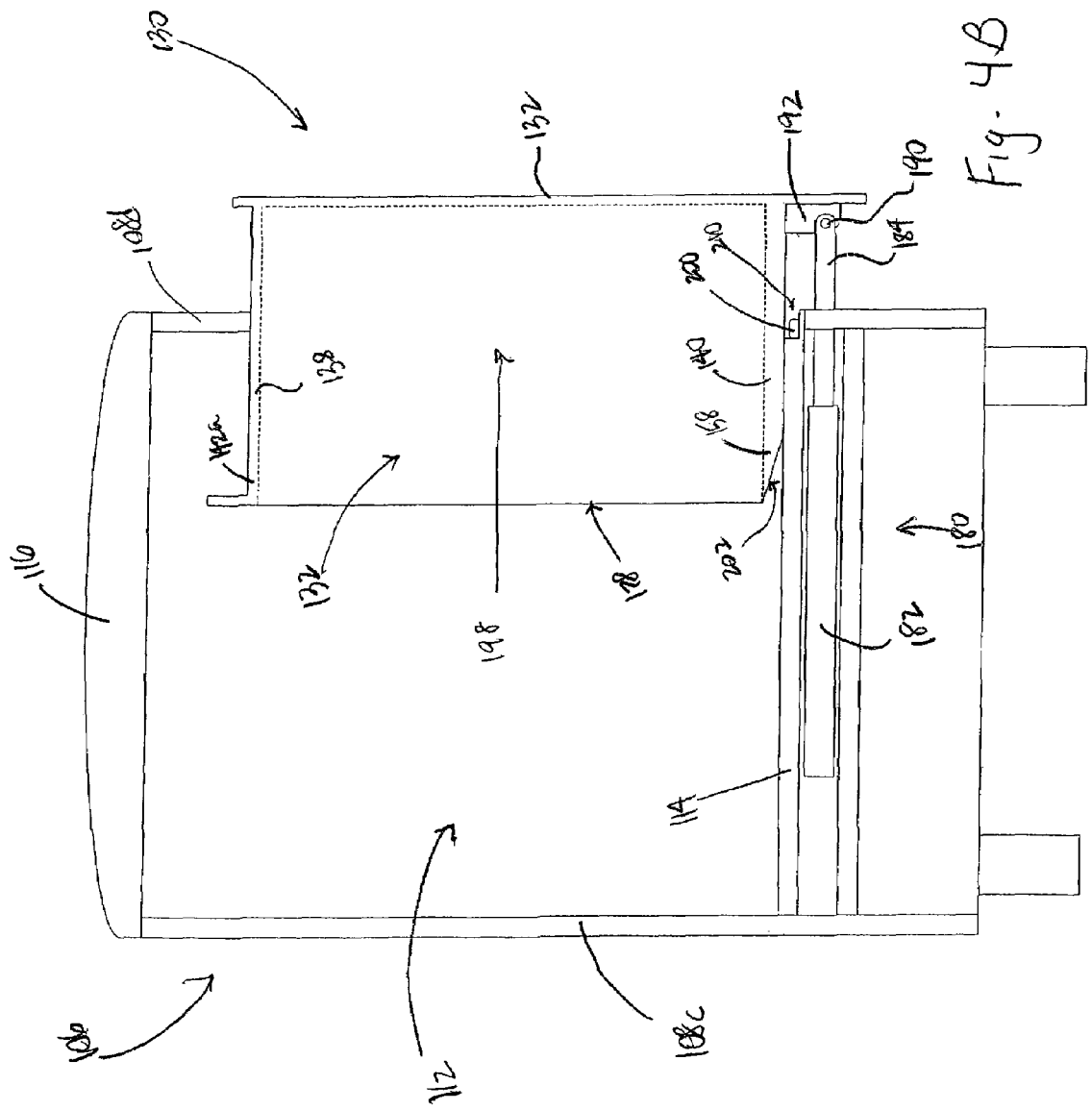

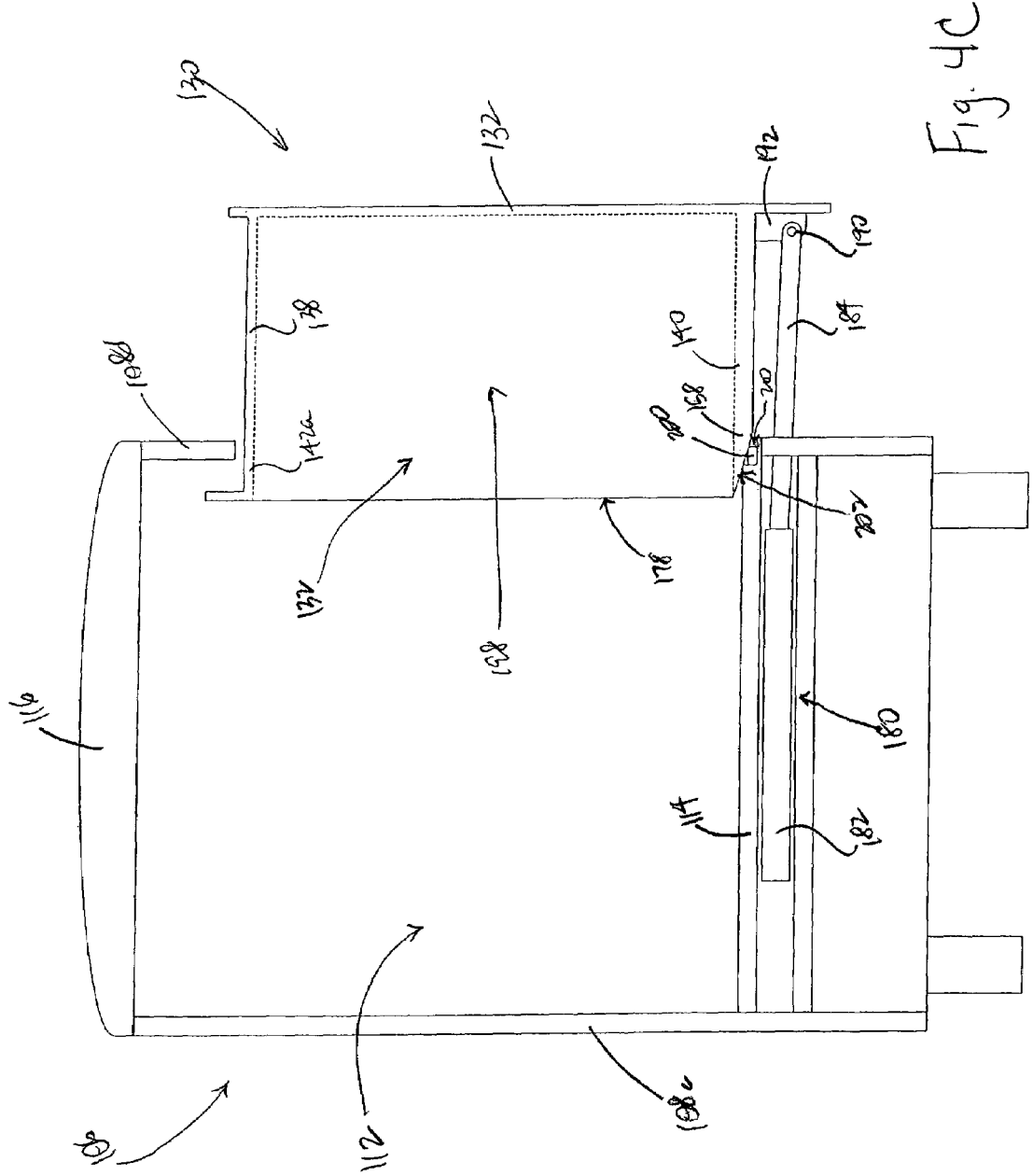

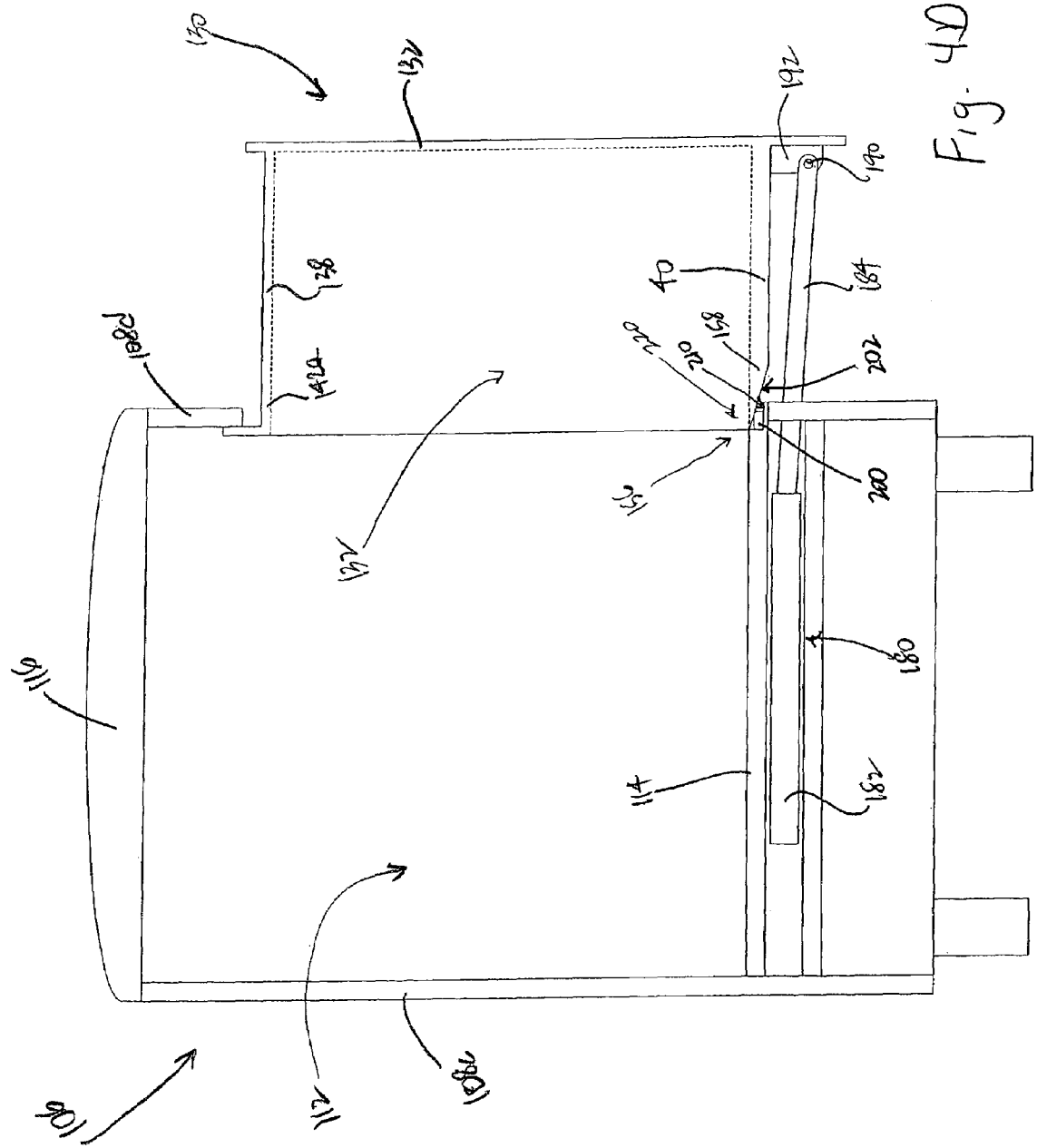

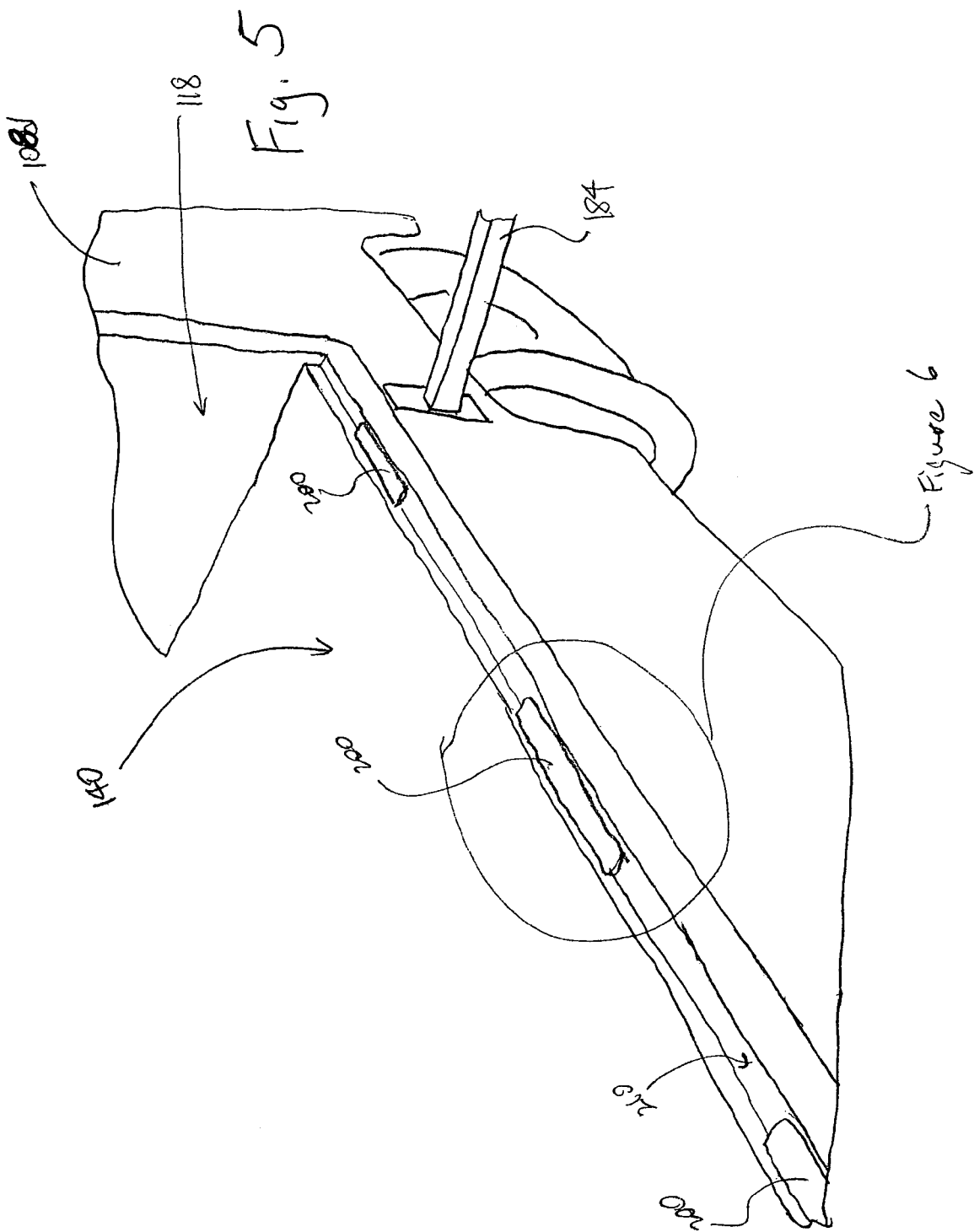

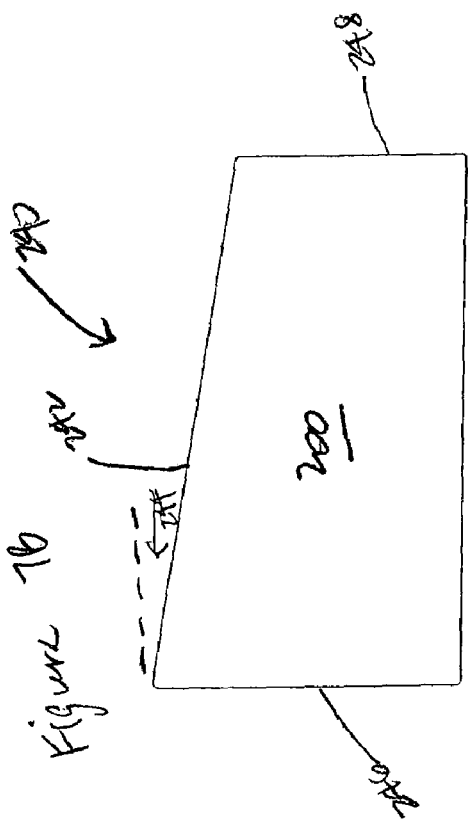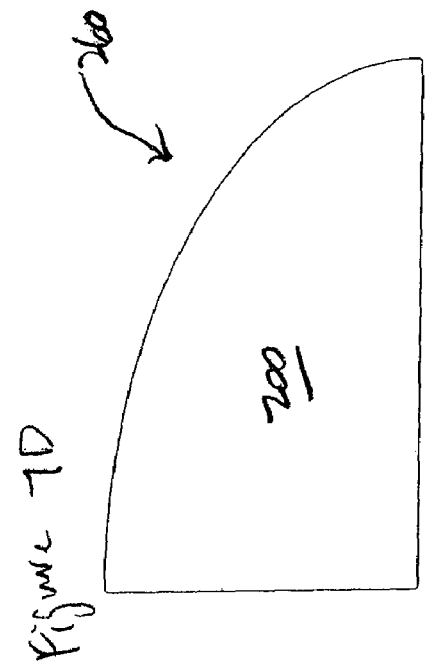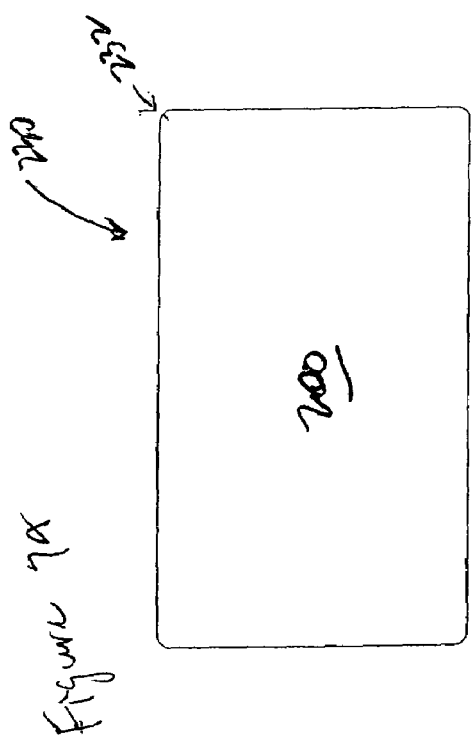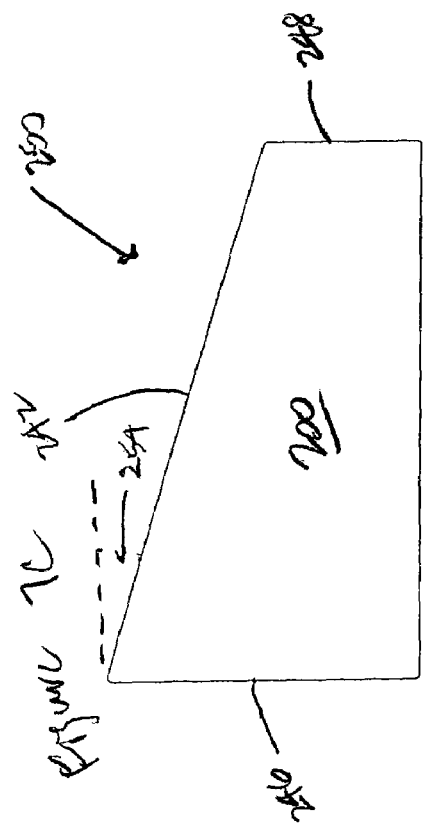

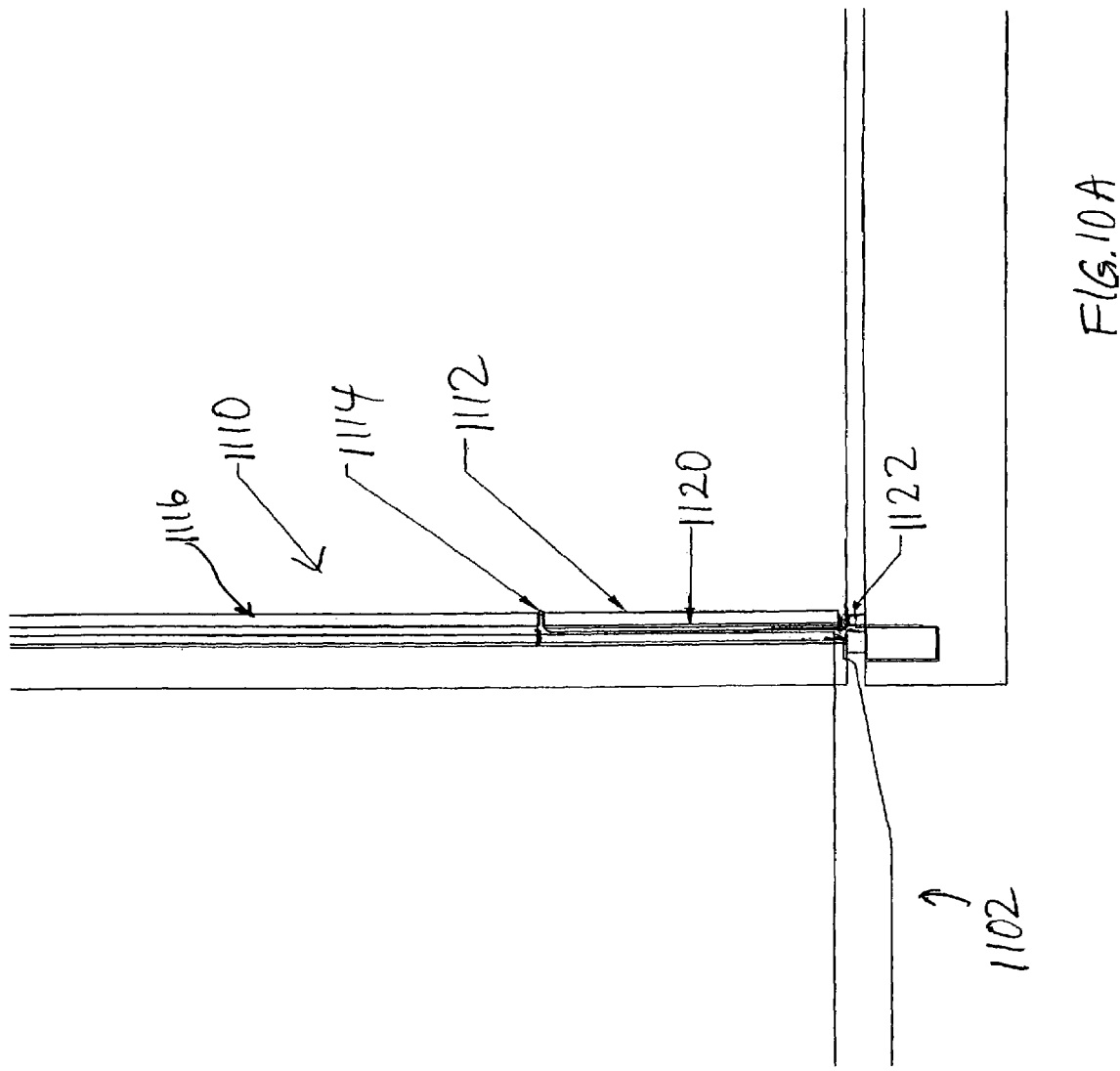

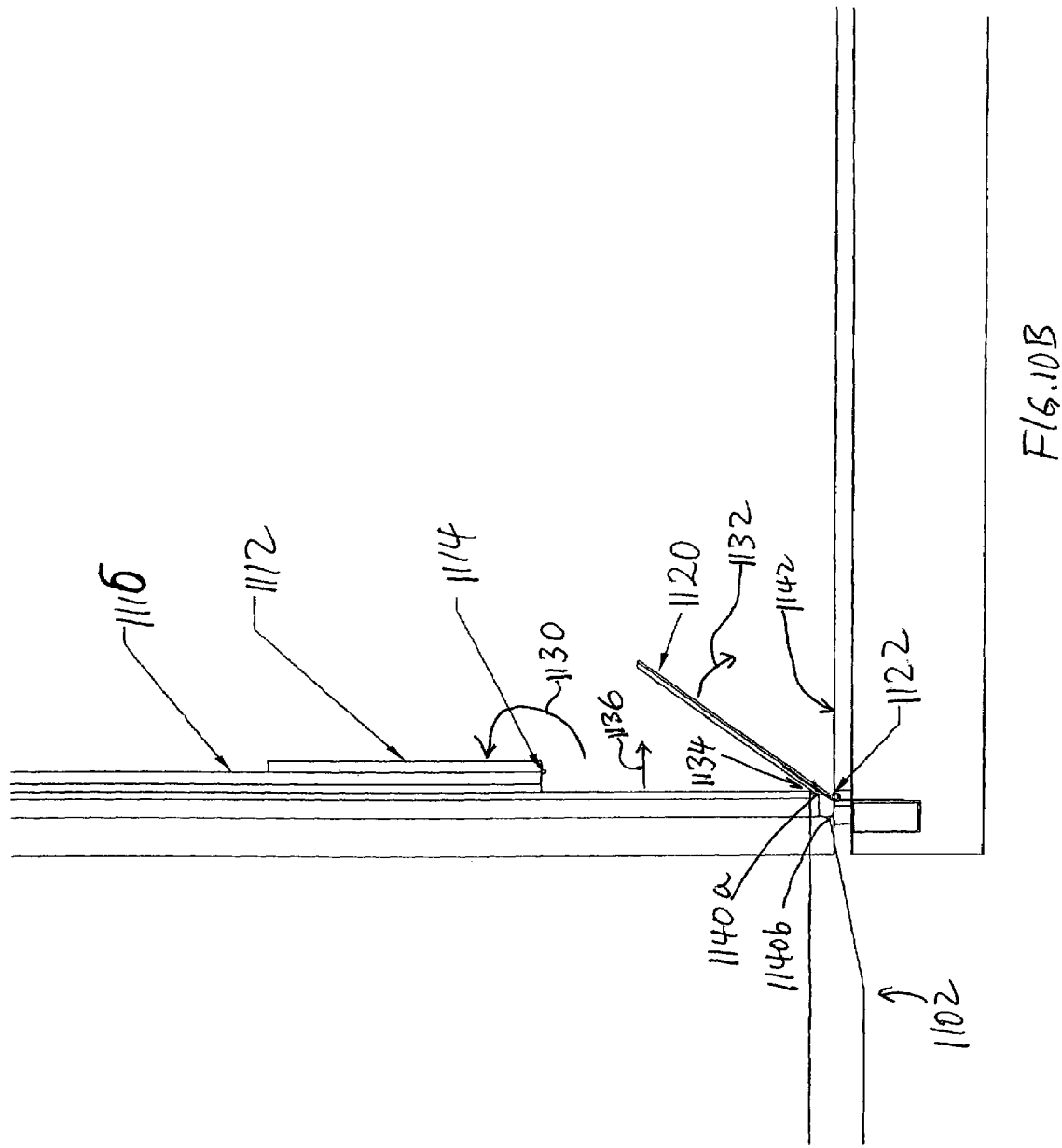

SLIDE-OUT GLIDING SYSTEM FOR RECREATIONAL VEHICLES

CLAIM OF PRIORITY

This application claims the benefit of U.S. Provisional Application Nos. 60/645,300, filed on Jan. 19, 2005, entitled "SLIDE-OUT GLIDING SYSTEM FOR RECREATIONAL VEHICLES" and 60/645,332, filed on Jan. 19, 2005, entitled "FLOOR SURFACE PROTECTION SYSTEM FOR SLIDE-OUTS," which are hereby incorporated by reference in their entirety.

BACKGROUND

1. Field

The present invention relates to recreational vehicles and, in particular, relates to an improved method and system for deploying and retracting recreational vehicle slide-outs.

2. Description of the Related Art

Recreational vehicles are becoming increasingly popular with people who wish to retain the comforts and conveniences of home while spending extended periods of time away from home at remote locations. In more elaborate configurations, the recreational vehicle typically includes interior living areas with modern amenities and convenience fixtures. Also, a recreational vehicle may be easily parked at a wide variety of locations so that users may enjoy the amenities of the vehicle at their favorite destination. Consequently, people who use recreational vehicles may be assured of a comfortable living environment at their preferred remote destination without having to rely on the availability of suitable hotels.

In response to consumer demand, manufacturers have developed increasingly larger recreational vehicles. In particular, manufacturers have developed recreational vehicles with one or more extendable structures, commonly referred to as slide-outs, that provide the user with a supplemental living space when the vehicle is parked in a suitable location. The extendable structure are adapted to extend into a deployed position during when the vehicle is parked so that the interior living space within the recreational vehicle can be increased. The extendable structure is also adapted to retract into a retracted position when the vehicle is in motion or towed so that the traveling dimensions of the recreational vehicle are within the maximum allowed length and width.

The typical extendable structure or slide-out is positioned within an opening of the vehicle housing and is usually comprised of a plurality of walls that form the supplemental living space therein and an opening that provides access to the supplemental living space. In general, the walls of the slide-out may comprise an upper horizontal wall that forms either a single level planar ceiling, which may substantially align with an adjacent ceiling of the vehicle, or a step configuration, wherein the ceiling of the slide-out is dimensionally lower than the ceiling of the adjacent ceiling of the vehicle. In addition, the extendable structure or slide-out may also comprise an outer vertical wall that is adapted to align with an outer wall of the main housing, when the slide-out is placed in the retracted position. Also, a pair of horizontal walls may be utilized to join the upper and lower horizontal walls and the outer vertical wall together.

Moreover, the walls of the typical slide-out are comprised of a lower horizontal wall that forms a level planar floor, which may substantially align with an adjacent floor of the vehicle housing. Typically, the slide-out is lowered after deployment of the slide-out from the vehicle housing so that the lower horizontal floor forms a single level planar floor with the vehicle housing floor. Also, the slide-out is typically lifted prior to retraction of the slide-out within the vehicle housing. When deployed, many conventional slide-outs have a protruding lip section that extends from the slide-out floor to the vehicle housing floor and couples with a complementary lip section on the vehicle housing floor so as to form the level planar floor therebetween. Unfortunately, when the slide-out is retracted into the main housing, the protruding lip section of the slide-out floor reduces the width of the walkway thereby, which can be unsafe to passengers walking beside the retracted slide-out. For example, a passenger walking from the front to the rear of the main housing could trip over the protruding lip section of the slide-out floor and fall down causing bodily injury.

From the foregoing, there is a need to improve the structural safety of conventional slide-outs for recreational vehicles. To this end, there is also a reduced need for protruding lip sections on the supplemental floors of slide-outs.

SUMMARY

The aforementioned needs may be satisfied by a recreational vehicle comprising, in one embodiment, a main housing defining an interior living space having a floor located at a first level, wherein the main housing defines a first wall having an opening formed therein with a recessed region along a lower portion thereof. In addition, the recreational vehicle further comprises a slide-out housing having a floor, a roof, and an outer wall positioned within the opening in the first wall of the main housing, wherein an interior end of the slide-out floor is substantially vertically aligned with an interior end of the slide-out roof, and wherein the slide-out housing is adapted to be movable between a retracted position wherein the floor of the slide-out housing is positioned at a second level above the first level of the floor of the main housing and the outer wall is positioned substantially adjacent the first wall of the main housing and a deployed position wherein the outer wall is extended away from the first wall of the main housing and the floor of the slide-out housing is positioned at a third level below the second level so as to be more planar with the first level. Moreover, the recreational vehicle further comprises a vertical movement member positioned in the recessed region of the first wall so as to be adjacent the lower portion of the opening formed therein, wherein at least a portion of the floor of the slide-out glides along the vertical movement member during retraction so as to lift the slide-out housing to the second level and glides along the vertical movement member during deployment so as to lower the slide-out housing to the third level.

One embodiment of the present disclosure relates to a recreational vehicle that includes a main housing that defines an interior living space. The main housing includes a floor having a surface. The recreational vehicle further includes one or more slide-out that provides added interior living space when extended. The recreational vehicle further includes a surface floor protector having a first orientation and a second orientation. The first orientation of the surface floor protector includes the surface floor protector being interposed between the bottom portion of the slide-out and the floor surface to protect the floor surface from damage by the bottom of the of the slide-out. The second orientation of the surface floor protector includes the surface floor protector being swung away from the floor surface as the slide-out moves outward to its extended configuration.

BRIEF DESCRIPTION OF THE DRAWINGS

FIG. 2 illustrates an exploded view of the recreational vehicle.

FIGS. 4A-4D illustrate a cross-sectional view of the recreational vehicle.

FIG. 5 illustrates a partial perspective view of the recreational vehicle.

FIG. 6 illustrates one embodiment of a gliding member.

FIGS. 7A-7D illustrate various contours of the gliding member.

FIGS. 10A to 10C show various stages of an example slide-out being retracted from its extended configuration, with a floor surface protection system being deployed to protect the floor surface.

DETAILED DESCRIPTION OF SOME EMBODIMENTS

Reference will now be made to the drawings wherein like numerals refer to like parts throughout. An improved system for deploying and retracting recreational vehicle slide-out housings or expandable rooms will be described in greater detail herein below with reference to the drawings.

Figure 1:
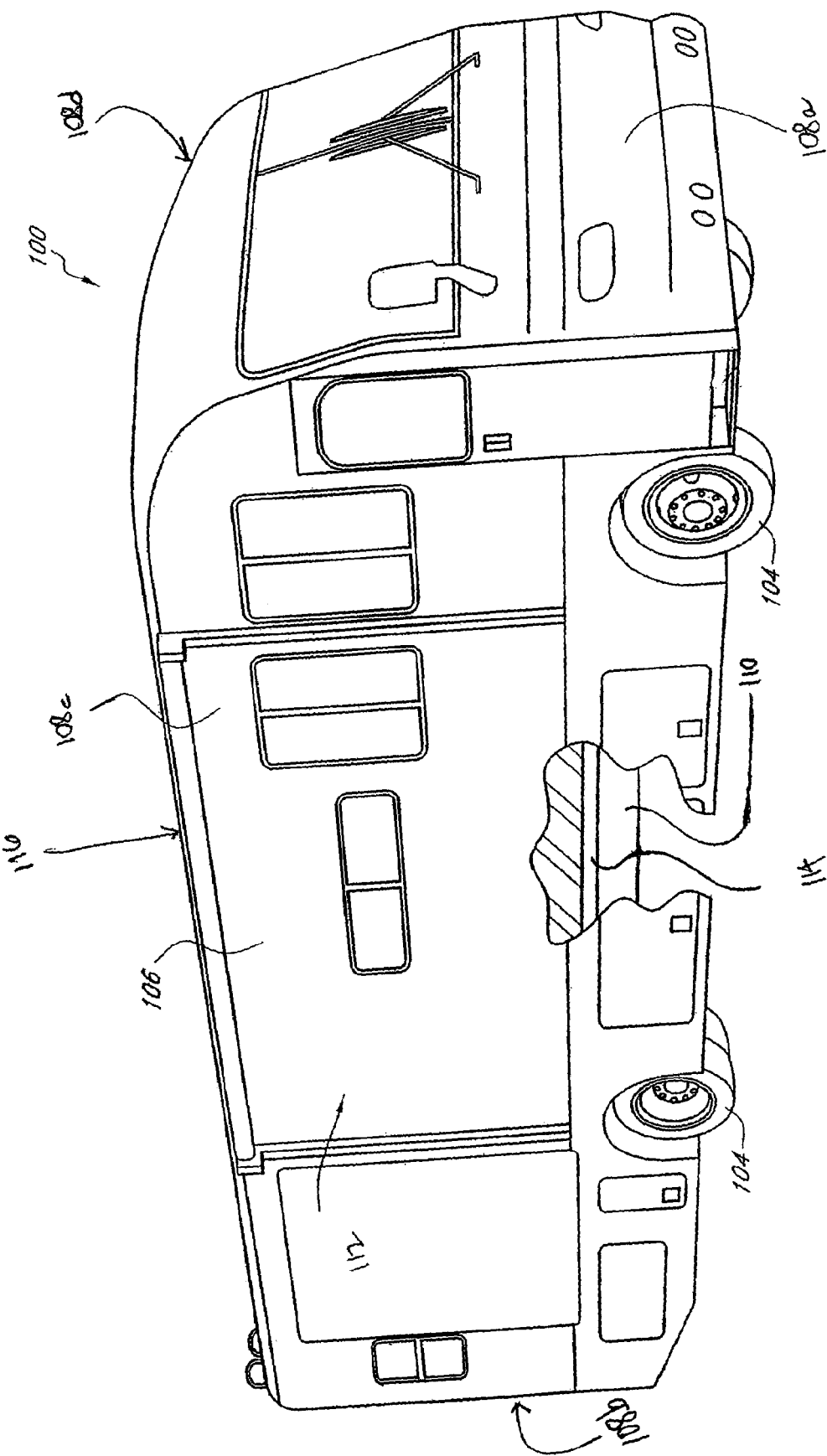
FIG. 1 illustrates one embodiment of a recreational vehicle.

FIG. 1 illustrates one embodiment of a recreational vehicle (RV) 100 having a generally rectangular chassis 102 (shown in FIG. 2) attached to a plurality of wheels 104 so as to permit rolling movement of the RV 100 over the ground. The RV 100 further comprises a main housing or coach 106 that is essentially formed of a plurality of exterior walls 108a, 108b, 108c, 108d that are joined together and mounted to a vehicle frame 110 in a generally known manner so as to define an interior living space 112 having a coach floor 114 and coach roof 116. A horizontal axis, which is substantially parallel to the coach floor 114, extends from a front wall 108a of the RV 100 to a rear wall 108b of the RV 100. Also, the RV 100 further comprises a first wall 108c and a second wall 108d that is positioned opposite the first wall 108c.

In one embodiment, as illustrated in FIG. 1, the RV 100 may comprise, for example, a motorhome. However, it should be appreciated by those skilled in the art that the RV 100 described herein can represent any movable coach on wheels, such as, but not limited to, the illustrated motorhome, a fifth-wheel trailer, a conventional trailer, a tent trailer, or even a cab-over camper for use with a pick-up truck. In general, the RV 100, such as the motorhome illustrated in FIG. 1, permits occupants to travel and live inside the RV 100 in a comfortable manner. One aspect of comfort pertains to the main housing or coach 106 having sufficient living space within the RV 100. In one aspect, the interior living space 112 may be partitioned with interior walls and passageways (shown in FIG. 2) in a generally known manner so as to define interior rooms and various interior living spaces, such as a kitchen, bedroom, bathroom, etc. and generally enhance the comfort of the RV 100.

Additionally, the RV 100 may further comprise an engine, transmission, drive axle, fuel system, and electrical system of types generally known in the art to provide the motive power for the RV 100. The chassis 102 also facilitates mounting of relatively massive items, such as generators, air conditioners, and the like to the vehicle frame 102. As will be described in greater detail herein below with reference to FIG. 2, the vehicle frame 110 may further comprise sub-floor structural components, such as cross-supports and other various supporting members to provide strength and structural reinforcement to the walls 108a, 108b, 108c, 108d, coach floor 112, etc.

FIG. 2 illustrates an exploded view of the chassis 102, vehicle frame 110, and coach floor 114. In one embodiment, the vehicle frame 110 is mounted on the chassis 102 in a manner as described in U.S. Pat. No. 6,807,735 entitled "Method of Fabricating a Motorhome," which is hereby incorporated by reference in its entirety. In one aspect, the chassis 102 may comprise a split rail or raised rail chassis of a type generally known in the art. For example, the chassis 102 may comprise a diesel pusher type that is available commercially from Freightliner, LLC. of Portland, Oreg. as Model XC.

As further illustrated in FIG. 2, the vehicle frame 110 may be formed of a plurality of structural support members 120 that are arranged and joined together so as to define a substantially rectangular planar floor section 132. In one embodiment, the structural members 120 may comprise elongate support members 122 that extend along the length of the RV 100 and substantially parallel to the chassis 102. Also, the structural members 120 may further comprise cross-support members 124 that extend between and substantially perpendicular to the elongate support members 122. In addition, the structural members 120 may be distally spaced apart so as to define cavity regions 134 between structural members 120.

Figure 3A:
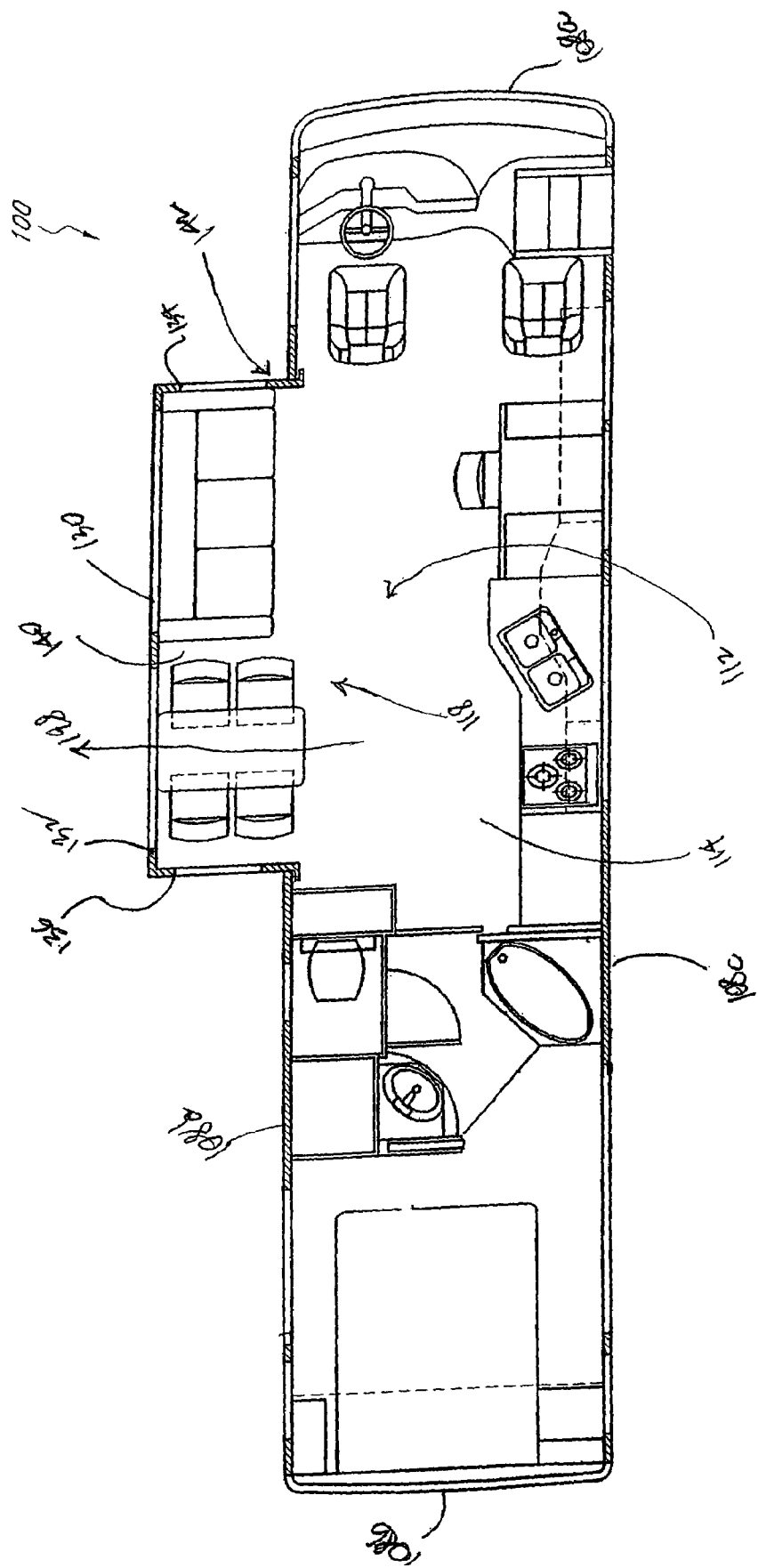
FIGS. 3A-3B illustrates one embodiment of a detailed plan view of the interior living space of the recreational vehicle.
Figure 3B:
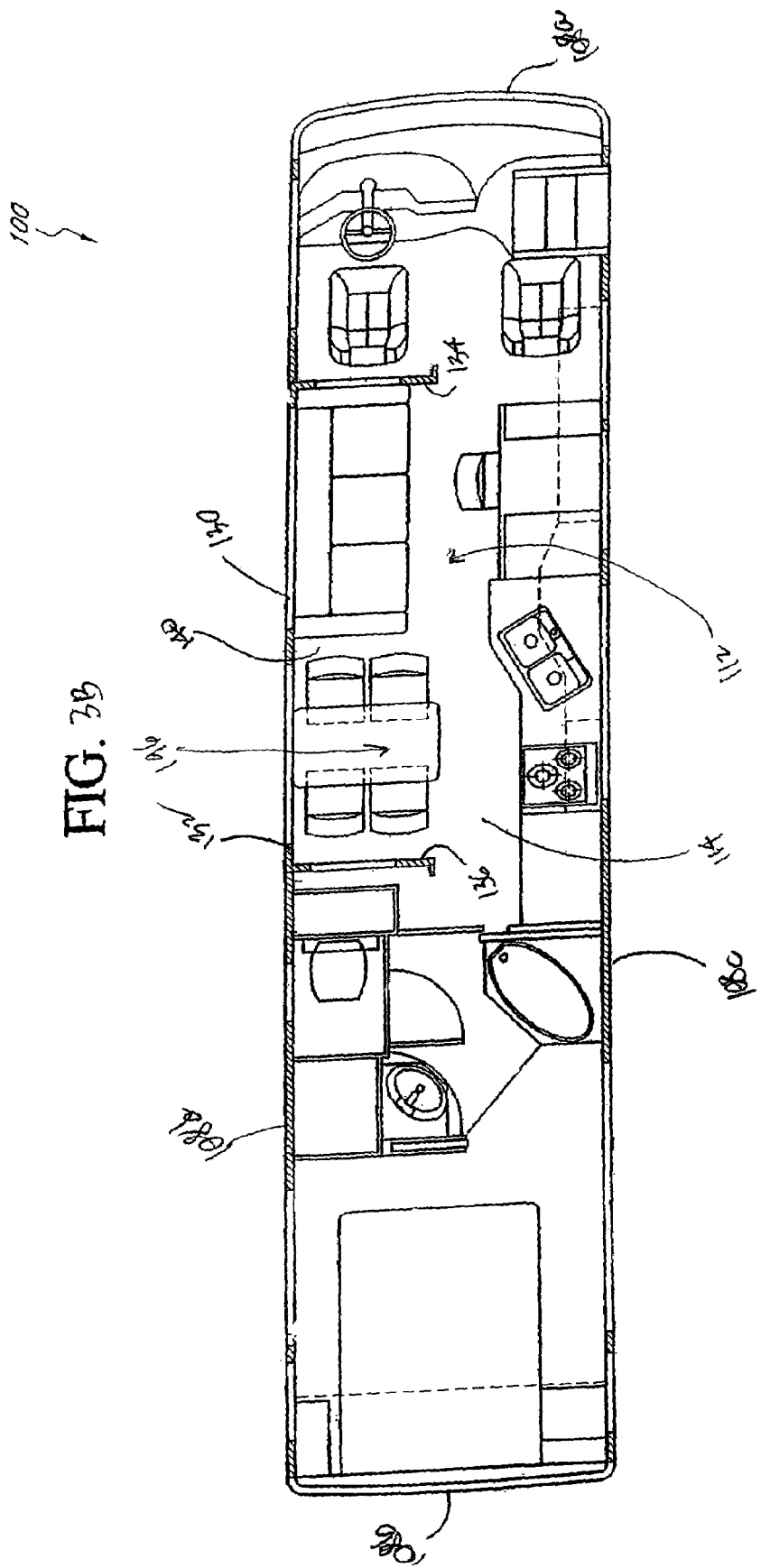

Moreover, the structural support members 110 may further comprise an armature assembly 126 having one or more telescoping members 180 that function to retract and deploy a slide-out 130 (shown in FIGS. 3A-3B). As illustrated, the one or more telescoping members 180 of armature assembly 126 are mounted to the vehicle frame 110 in a substantially parallel manner. Further detailed explanation related to the structural support members 120, 122, 124, 126 and construction of the vehicle frame 110 are more fully disclosed in U.S. Pat. No. 6,807,735 entitled "Method of Fabricating a Motorhome."

In one embodiment, the coach floor 114 may be mounted to the planar floor section 132. The coach floor 114 may comprise a plurality of rectangular pieces of plywood that are placed so as to abut each other in a coplanar fashion to thereby form a substantially planar, rectangular flooring structure. It should be appreciated that the coach floor 114 may also comprise a single piece of material, such as plywood, without departing from the scope of the present teachings. The coach floor 114 may be placed directly on the vehicle frame 110 and attached to the vehicle frame 100 via a plurality of screws, adhesive, etc. in a generally known manner. In one aspect, the coach floor 114 provides a continuous flooring surface for the RV 100 to support occupants and furniture in the interior living space 112 of the RV 100. Moreover, the coach floor 114 may also provide a support and attachment flooring surface for padding, carpeting, tile, linoleum, or various other interior floor finishings.

FIGS. 3A-3B illustrate one embodiment of a detailed plan view of the interior living space 112 of the RV 100 of FIG. 1. It will be appreciated that the layout of the interior living space 112 as illustrated herein is simply one illustrative embodiment and that a number of variations to this layout may be made by those skilled in the art without departing from the scope of the present teachings. In one aspect, the interior living space 112 may be sub-divided into separate living spaces, areas, or rooms with a plurality of interior walls in a manner as described in U.S. Pat. No. 6,293,612 entitled "Recreational Vehicles with Expandable Room," which is hereby incorporated by reference in its entirety.

As illustrated in FIGS. 3A, 3B, the RV 100 may further comprise a slide-out 130 that may be configured to deploy and retract from an opening 118 formed in the second wall 108d of the coach 106 so as to expand the interior living space 112 of the RV 100 by an amount at least as much as the area of the slide-out 130. In particular, FIG. 3A illustrates the slide-out 130 in a deployed configuration so as to effectively increase the inner living space 112 of the RV 100. FIG. 3B illustrates the slide-out 130 in a retracted configuration so as to provide the RV 100 with a more suitable size and shape for traveling on a road.

In one embodiment, the slide-out 130 is formed of a plurality of walls that are joined together so as to form a supplemental living space therein as described in U.S. Pat. No. 6,293,612 entitled "Recreational Vehicles with Expandable Room." In addition, the plurality of walls include an outer vertical wall 132, a front vertical wall 134, a rear vertical wall 136, an overhead horizontal roof 138, and a lower horizontal floor 140 all of which are joined and interconnected in a manner so as to form the slide-out 130. The overhead horizontal roof 138 functions as a supplemental slide-out roof, and the lower horizontal floor 140 functions as a supplemental slide-out floor. Moreover, when joined together in a manner to form the slide-out 130, the plurality of walls including the supplemental roof and floor 138, 140, as a collective, are movable so as to slide in and out of the coach 106. In one aspect, when deployed, the slide-out 130 increases the inner living space 112 by an amount at least as much as the effective area comprised by the slide-out 130. Additionally, when retracted, the slide-out 130 reduces the effective area of the inner living space 112.

Furthermore, it should be appreciated by those skilled in the art that the slide-out 130 comprises a frame (not shown) including various structural support members for the walls 132, 134, 136, roof 138, and floor 140. In one aspect, the frame of the slide-out 130 may comprise similar structural support members as previously described with reference to the vehicle frame 110 of the main housing or coach 106.

FIGS. 4A-4D illustrate a cross-sectional view of the RV 100 including the coach 106 and the slide-out 130. As will be described in greater detail herein below, the slide-out or expandable room 130 is deployed in a manner such that, when deployed, the floor 140 of the slide-out 130 is substantially parallel to the coach floor 114 of the RV 100. Advantageously, when the slide-out floor 140 is substantially aligned with the coach floor 114, the floors 114, 140 form a substantially uniform planar flooring surface 156 (FIG. 4D) between the coach 106 and the slide-out 130.

As previously described and illustrated in FIGS. 3A-3B, the slide-out 130 comprises exterior walls including the outer wall 132, front vertical wall 134, rear vertical wall 136, supplemental roof 138, and supplemental floor 140 that are joined together so as to define a supplemental interior living space 132. In one embodiment, the slide-out roof 138 comprises first and second ends 142a, 142b including a first lip section 152 attached to the first end 142a in a substantially perpendicular manner. The first lip section 152 abuts the second wall 108d of the coach 106 when the slide-out 130 is deployed so that the first lip section 152 limits the outward travel of the slide-out 130 from the opening 118 formed in the second wall 108d of the coach 106.

In addition, the outer wall 132 comprises an upper section 154a that attaches to the second end 142b of the slide-out roof 138 and a lower section 154b that attaches to the slide-out floor 140 in a substantially perpendicular manner. In one aspect, it should be appreciated by those skilled in the art that the second end 142b of the slide-out roof 138 may be attached to the upper section 154a of the outer wall 132 of the slide-out 130 at an angular offset such that the first end 142a of the slide-out roof 138 may be at a height that is at least greater than the height of the second end 142b of the slide-out roof 138 with respect to the slide-out floor 140. Moreover, the outer wall 132 further comprises flanged edges 160 positioned adjacent to the outer perimeter of the outer wall 132 of the slide-out 130 that abut the second wall 108d of the coach 106 when the slide-out 130 is retracted. In one aspect, the flanged edges 160 are positioned adjacent to the coach 106 when the slide-out 130 is retracted so that the flanged edges 160 limit the inward travel of the slide-out 130 into the opening 118 formed in the second wall 108d of the coach 106. Also, the flanged edges 160 of the outer wall 132 function as sealing components to prevent the external environment from affecting the climate within the interior living spaces 112, 132.

Additionally, the coach 106 further comprises a telescoping member 180 having a device housing 182 that is attached to the vehicle frame 108 and an armature 184 that distally extends from the device housing 182 so as to deploy the slide-out 130 from the coach 106 via the opening 118 in the second wall 108d. The armature 184 also extends within the device housing 182 so as to retract the slide-out 130 into the coach 106 via the opening 118 in the second wall 108d. It should be appreciated by those skilled in the art that the device housing 182 may also be attached to the coach floor 112 or a component of the coach floor 112 without departing from the scope of the present teachings.

Additionally, the armature 184 is attached to the slide-out floor 140 via a fastening pin 190 and a bracket member 192. In one embodiment, the bracket member 192 is mounted to a portion of the slide-out floor 140. The armature 184 couples to the bracket member 192 via the fastening pin 190 so that the slide-out 130 including the slide-out floor 140 can freely move during deployment and retraction of the slide-out 130. In addition, as will be described in greater detail herein below, the slide-out 130 can be lifted and lowered during deployment and retraction by a gliding member 200 in contact with an inclined component 202 of the slide-out floor 140. Advantageously, this allows the floor 140 of the slide-out 130 to be substantially level with the floor 114 of the coach 106.

During deployment, the telescoping member 180 applies a pushing force to the armature 184 in a generally known manner so as to deploy or push the slide-out 130 from the coach 106 by extending the armature 184 in a pushing direction 200 away from the opening 118 in the second wall 108d. In one aspect, the applied pushing force of the telescoping member 180 is transferred from the armature 184 to the fastening pin 190 and then to the bracket member 192. Since the bracket member 192 is attached to the slide-out floor 140, the applied pushing force thereby pushes the slide-out 130 out of the opening 118 in the second wall 108d via the coupling of the fastening pin 190 and the bracket member 192.

Similarly, during retraction, the telescoping member 180 applies a pulling force to the armature 184 in a generally known manner so as to retract or pull the slide-out 130 towards the coach 106 by extending the armature 184 in a pulling direction 196 towards the opening 118 in the second wall 108d. In one aspect, the applied pulling force of the telescoping member 180 is transferred from the armature 184 to the fastening pin 190 and then to the bracket member 192. Since the bracket member 192 is attached to the slide-out floor 140, the applied pulling force thereby pulls the slide-out 130 towards the opening 118 in the second wall 108d via the coupling of the fastening pin 190 and the bracket member 192.

FIGS. 4A-4D further illustrate a process for lowering the slide-out 130 during deployment using the gliding member 200 and the inclined component 198 of the slide-out floor 140. However, it should be appreciated that the illustrated process may also be ordered in reverse from FIG. 4D to FIG. 4A for lifting the slide-out 130 during retraction using the gliding member 200 and the inclined component 202 of the slide-out floor 140.

FIG. 4A illustrates the slide-out 130 in the retracted configuration as also illustrated in FIG. 3B. The slide-out 130 is positioned in a lifted orientation such that the slide-out floor 140 is substantially aligned with the coach floor 112 of the RV 100 and the gliding member 200 is positioned in a recessed region 210 that is formed in the second wall 108d adjacent to the lower portion of the opening 118. In one aspect, the slide-out 130 including the floor 140 of the slide-out 130 is supported by the one or more telescoping members 180 during deployment and retraction. In addition, when the slide-out 130 is retracted, the flanged edges 160 of the outer wall 132 of the slide-out 130 abut the second wall 108d of the coach 106 so as to form a second contact seal 206 therebetween.

In one embodiment, the recessed region 210 is formed along a lower portion of the opening 114 that is formed in the second wall 108d of the coach 106, and the gliding member 200 is positioned in the recessed region 210 so as to be at least lower than the main housing floor 114. Thus, in one aspect, the slide-out floor 140 does not contact the gliding member 200 when the slide-out 130 is in the retracted configuration.

As will be described herein below, the inclined component 202 of the slide-out floor 140 contacts the gliding member 200 during deployment of the slide-out 130 so as to lower the slide-out 130 to a position where the slide-out floor 140 is substantially level with the main housing floor 114. Also, the inclined component 202 of the slide-out floor 140 contacts the gliding member 200 during retraction of the slide-out 130 so as to lift the slide-out 130 to a position where the slide-out floor 140 is above with the main housing floor 114. Moreover, it should be appreciated by those skilled in the art that the gliding member 200 may comprise a plurality of gliding members 200 that are each positioned in the recessed region 210.

In one aspect, the inclined component 202 of the slide-out floor 140 is positioned adjacent a first end 158 of the slide-out floor 140. In addition, the inclined component 202 may be formed as an integral part of the slide-out floor 140 that is positioned thereon to contact the gliding member 200 during deployment and retraction of the slide-out 130 from the coach 106. Also, the inclined component 200 may be adapted to function as ramp to lift the slide-out 130 during retraction and lower the slide-out 130 during deployment.

In another aspect, as illustrated in FIGS. 4A-4D, the first end 142a of the slide-out roof 138 is substantially vertically aligned with the first end 158 of the slide-out floor 140. In general, the first end 142a of the slide-out roof 138 is positioned with respect to the first end of the slide-out floor 140 so as to define a vertical axis 178 therebetween. Also, the vertical axis 178 is substantially parallel to the outer vertical wall 132 of the slide-out 130. This provides for a walkway 166 within the interior living space 112 of the coach 106 for passengers to walk beside the retracted slide-out 130. As illustrated in FIG. 4A, the walkway 166 defines a width 168 between the first wall 108c of the coach 106 and the vertical axis 178. Also, the vertical axis 178 may be further defined by the ends of the front and back walls 134, 136 of the slide-out 130 as illustrated in FIGS. 3A-3B.

FIG. 4B illustrates the slide-out 130 being partially deployed by the telescoping member 180. As illustrated in FIG. 4B, the slide-out 130 is moving outward from the coach 106 via the opening 118 formed in the second wall 108d thereof.

FIG. 4C illustrates the slide-out 130 being partially lowered during deployment. As illustrated in FIG. 4C, a portion of the inclined component 202 of the slide-out floor 140 contacts the gliding member 200. In one embodiment, as slide-out 130 is being deployed, the gliding member 200 maintains contact with at least a portion of the inclined component 202 of the slide-out floor 140, which causes the slide-out 130 to be downwardly shifted or lowered so that the slide-out floor 140 begins to move to the lowered position adjacent the coach floor 112. In general, it should be appreciated by those skilled in the art that the armature 184 of the telescoping member 180 is adapted to flex during deployment due to the force of the weight of the slide-out 130 bearing down thereon.

FIG. 4D illustrates the slide-out 130 in the deployed configuration as also illustrated in FIG. 3A. In one aspect, as illustrated in FIG. 4D, the floor 140 of the slide-out 130 is substantially level with the floor 114 of the coach 106 so as to form a substantially uniform flooring surface 220 between the coach 106 and slide-out 130. In addition, when the slide-out 130 is in the deployed configuration, the inclined component 202 of the slide-out floor 140 rests on at least a portion of the gliding member 200. In another aspect, when deployed, the slide-out 130 including the floor 140 of the slide-out 130 is supported by the one or more gliding members 200 and the one or more telescoping members 180.

Advantageously, the slide-out 130 can be lowered from the lifted or raised position to the lowered position during deployment as illustrated in FIGS. 4A-4D via contact between the gliding member 200 and the inclined component 202 of the slide-out floor 140. Similarly, the slide-out 130 can be lifted or raised to the lifted position by reversing the order of FIGS. 4A-4D. The ease and manner in which the gliding member 200 and the inclined component 202 of the slide-out floor 114 achieves this improves the efficiency of the deployment and retraction of slide-outs 130 from the coaches 106 of recreational vehicles 100. Further scope related to the gliding member 200 will be described in greater detail herein below.

FIG. 5 illustrates a partial perspective view of the coach 106. In particular, FIG. 5 illustrates a perspective view of the recessed region 210 formed adjacent the lower portion of the opening 118 that is formed in the second wall 108d of the coach 106. In one embodiment, as illustrated in FIG. 5, the recessed region 210 comprises a substantially rectangular contour that extends along the length of the lower portion of the opening 118. It should be appreciated by those skilled in the art that the shape of the recessed region 210 may comprise various geometric shapes, such as square, angular, circular, etc., depending on the particular implementation without departing from the scope of the present teachings.

Additionally, in one aspect, the one or more gliding members 200 can be positioned in the recessed region 210 formed adjacent the lower portion of the opening 118 so as to be at least lower than the coach floor 114 and at least inward from the exterior portion of the second wall 108*d*. It should be appreciated by those skilled in the art that the gliding member 200 may be elongated to a length similar to the width of the slide-out 130 so as to fit in the recessed region 210 along the lower portion of the opening 118 without departing from the scope of the present teachings.

In another aspect, the one or more gliding members 200 are positioned in the recessed region 210 along the lower portion of the opening 118 so as to align with inclined components 202 of the slide-out floor 140. Thus, during deployment or retraction of the slide-out 130, the inclined components 202 of the slide-out floor 140 can contact the one or more gliding members 200 so as to lower or lift the slide-out 130 into a raised or lowered in a manner as previously described herein.

FIG. 6 illustrates a perspective view of the gliding member 200. In particular, FIG. 6 illustrates a perspective view of the gliding member 200 positioned in a portion of the recessed region 210 as illustrated in FIG. 5. In one embodiment, as illustrated in FIG. 6, the gliding member 200 comprises a substantially rectangular contour with rounded edges so as to fit the contour of the recessed region 210. Additionally, the gliding member 200 comprises a durable material, such as plastic, etc., that is selected to support the weight of the slide-out 130 and withstand the stress of deployment and retraction of the slide-out 130.

FIGS. 7A-7D illustrate various contours of the gliding member 200. In particular, FIG. 7A illustrates the gliding member 200 having a substantially rectangular contour 230 with rounded corners 232. FIG. 7B illustrates the gliding member 200 of FIG. 7A having a first angular contour 240 with an upper side portion 242 having a first angular offset 244 from a first side 246 to a second side 248. FIG. 7C illustrates the gliding member 200 of FIG. 7B having a second angular contour 250 with the upper side portion 242 having a second angular offset 254 from the first side 246 to the second side 248. It should be appreciated by those skilled in the art that the angular offset 244, 254 of the upper side portion 242 of the gliding member 200 may comprise any angle without departing from the scope of the present teachings. FIG. 7D illustrates the gliding member 200 having a substantially circular or rounded contour 260.

In some embodiments, the recreational vehicle can include surface floor protection system. The protected surface can be an area in the main housing that is associated with one or more slide-outs of the recreational vehicle.

Figure 8:
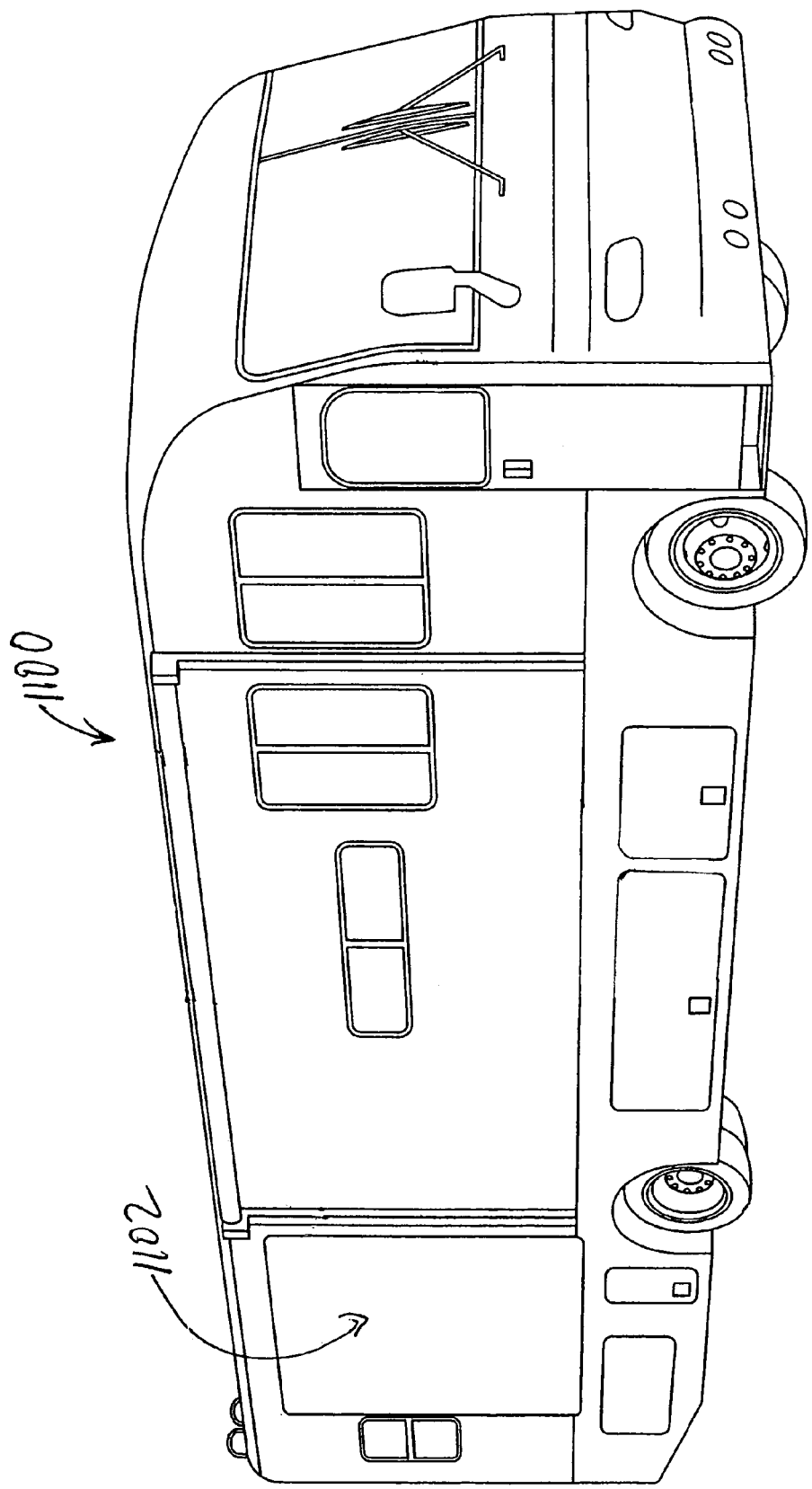
FIG. 8 shows one embodiment of an example recreational vehicle having one or more slide-outs.
Figure 9:
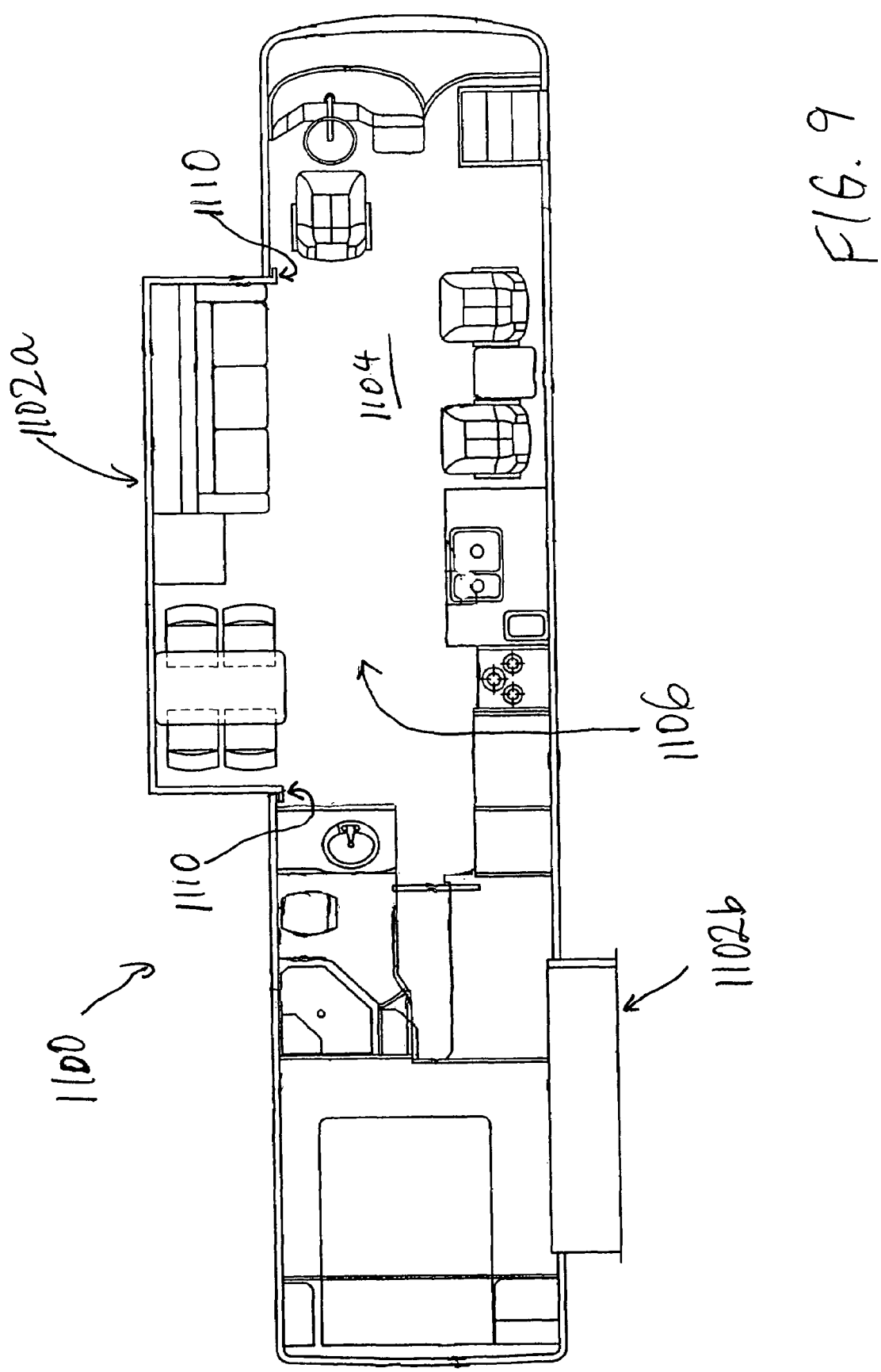

FIG. 8 shows one embodiment of an example recreational vehicle 1100 having one or more slide-outs 1102. Although the shown example recreational vehicle 1100 is a motorhome, it will be understood that the present teachings can be applied to other types of recreational vehicles, including but not limited to, fifth-wheel trailers and other trailers having extendable housings.

Figure 9:
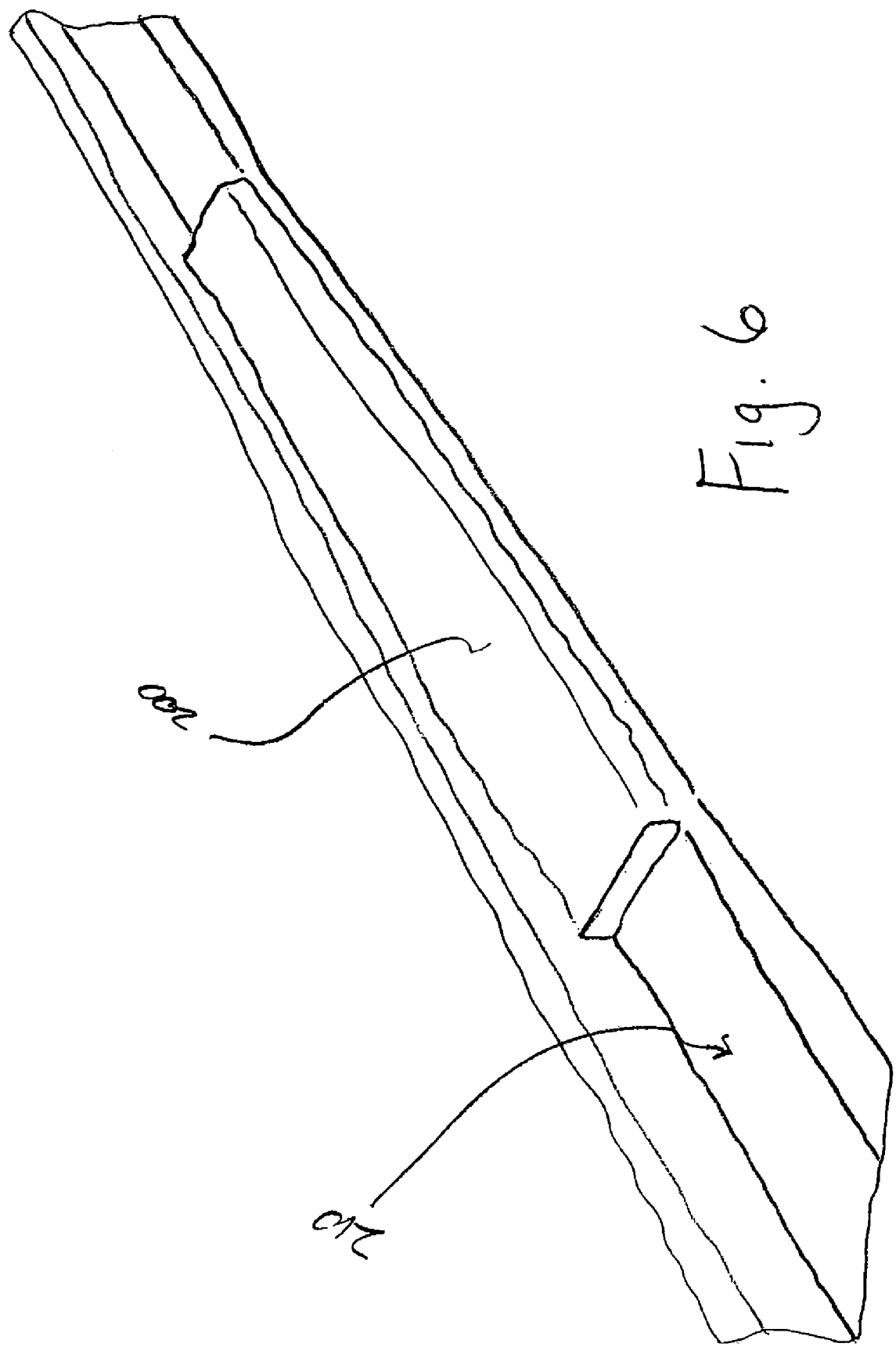
FIG. 9 shows one embodiment of an example interior living space of the recreational vehicle, showing that the one or more slide-outs can increase the amount of interior space.

FIG. 9 show one embodiment of an example interior living space 1104 of the recreational vehicle 1100. As shown, the recreational vehicle 1100 includes example slide-outs 1102*a* and 1102*b* that, when extended, increases the area of the interior living space 1104. As described below in greater detail, the recreational vehicle 1100 includes a floor surface protection system that protects a floor 1106 in the interior living space 1104. In one embodiment, such a system can be incorporated with a flange assembly 1110 associated with the slide-out 1102.

Figure 10C:
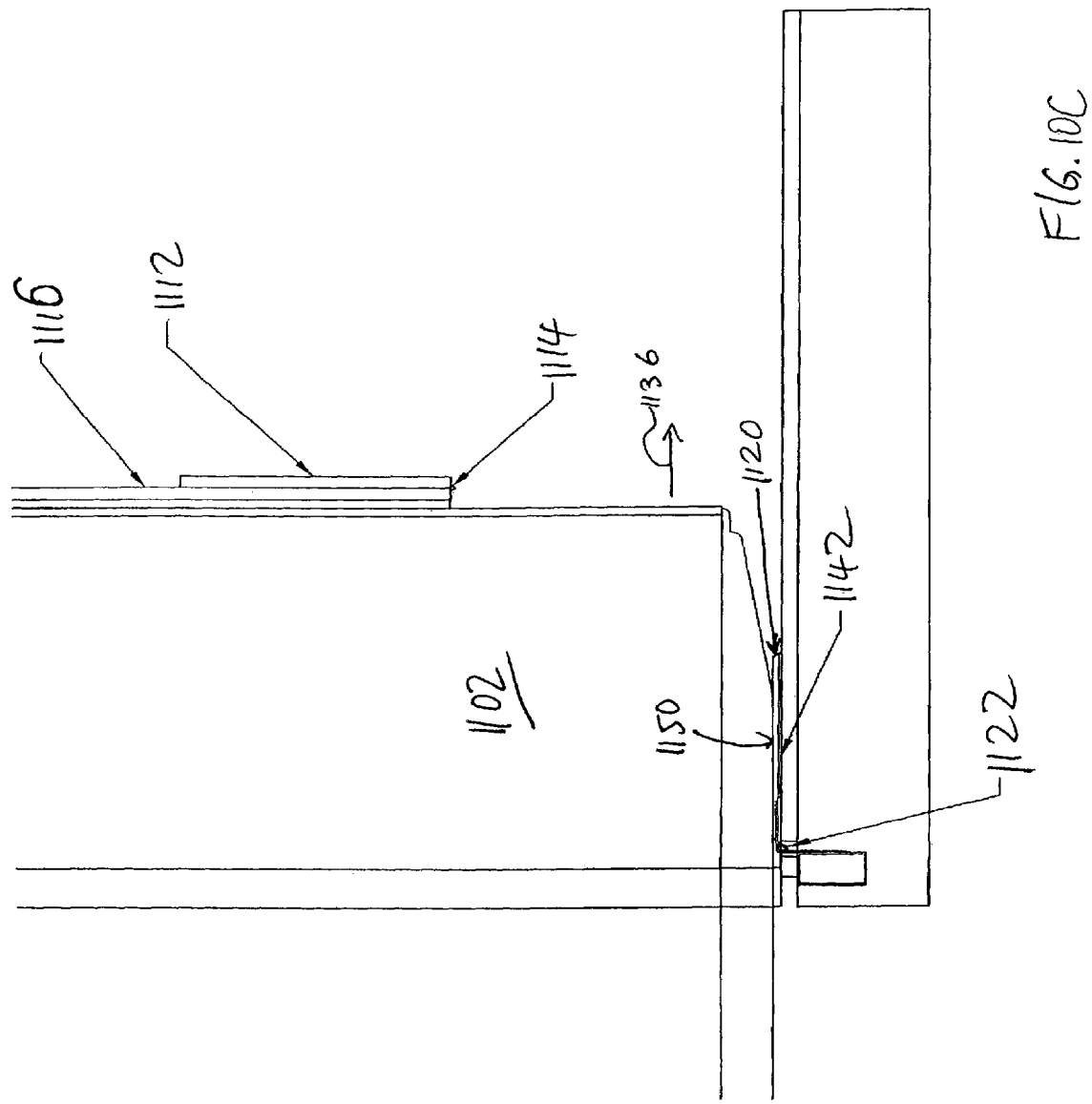

FIGS. 10A-10C now show by example one embodiment of the floor surface protection system in various stages as the example slide-out 1102 moves inward from its extended configuration. FIG. 10A shows the slide-out 1102 in its extended configuration. In one embodiment, the example flange assembly 1110 includes a substantially fixed decorative flange face 1116 and an articulating decorative flange face 1112. The articulating flange face 1112 is shown to be coupled to the fixed flange face 1116 via a hinge assembly 1114. When the slide-out 1102 is extended, the articulating flange face 1112 is in its "down" configuration and generally coplanar with the fixed flange face 1116. Thus, an occupant inside the recreational vehicle looking towards the slide-out 1102 sees a substantially contiguous decorative flange assembly 1110.

As further shown in FIG. 10A, one embodiment of the floor surface protection system includes a fold-down surface protector 1120 in its "up" configuration. In one embodiment, the surface protector 1120 is dimensioned to be able to fold up and behind the articulating flange face 1112. Thus, the surface protector 1120 is substantially hidden from view, and out of the way of the occupant. In one embodiment, the surface protector 1120 is coupled to the floor portion of the recreational vehicle via a spring hinge assembly 1122 so as to allow the "up" and "down" folding action of the surface protector 1120.

FIG. 10B shows the slide-out 1102 in its initial portion of an inward motion (indicated by an arrow 1136). As the slide-out 1102 moves inward a contact area 1140*a* is shown to make contact with the surface protector 1120. Such a contact (indicated as 1134) causes the surface protector 1120 to begin folding down (as indicated by an arrow 1132). In one embodiment, one or more contact areas (1140*a*, 1140*b*) make contact with the surface protector 1120.

In one embodiment, as further shown in FIG. 10B, the articulating flange face 1112 swings upward (as indicated by an arrow 1130) and out of the way of the downward folding motion of the surface protector 1120. Such upward motion of the articulating flange face 1112 can be triggered and actuated by any number of ways. For example, the hinge assembly 1114 can include a spring member that facilitates the upward motion of the articulating flange face 1112 when the slide-out begins its inward motion. A latching mechanism (not shown) can keep the articulating flange face 1112 in its downward configuration, and can be released when the slide-out begins its inward motion.

As further shown in FIG. 10B, the surface protector 1120 folds down towards a floor surface 1142. FIG. 10C shows the slide-out 1102 farther in, in its inward motion 1136. In one embodiment, a bottom portion 1150 of the slide-out 1102 now engages the surface protector 1120 sufficiently so that the surface protector 1120 is folded down and interposed between the bottom portion 1150 of the slide-out 1102 and the floor surface 1142. Thus, one can see that as the slide-out begins its inward motion (FIG. 10B) and continues (FIG. 10C), the surface floor 1142 is protected from possible damages from contacts with the bottom portion 1150 of the slide-out.

In one embodiment, the foregoing process is substantially reversed when the slide-out moves from its retracted configuration to the extended configuration.

In one embodiment, the floor includes a carpet. In other embodiments, the floor can be in other forms, including but not limited to, linoleum, tiles, laminate wood, and the like. Whatever the form the floor may be, the edge portions (or close to the edge) are more susceptible to damages. For example, as the bottom portion of the slide-out engages the edge portion of the carpet (example floor) of the main housing, the contact can cause the edge portion to be uplifted. Repeated contacts can eventually lead to sufficient "peeling" to cause damage to the carpet. Thus, one can see that the floor surface protection system of the present teachings can provide advantageous features as described herein.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A recreational vehicle comprising:
a main housing defining an interior living space having a floor located at a first level, wherein the main housing defines a first wall having an opening formed therein with a recessed region along a lower portion thereof;
a slide-out housing having a floor, a roof, and an outer wall positioned within the opening in the first wall of the main housing, wherein an interior end of the slide-out floor is substantially vertically aligned with an interior end of the slide-out roof, and wherein the slide-out housing is adapted to be movable between a retracted position wherein the floor of the slide-out housing is positioned at a second level above the first level of the floor of the main housing and the outer wall is positioned substantially adjacent the first wall of the main housing and a deployed position wherein the outer wall is extended away from the first wall of the main housing and the floor of the slide-out housing is positioned at a third level below the second level so as to be more planar with the first level; and
a vertical movement member positioned in the recessed region of the first wall so as to be adjacent the lower portion of the opening formed therein, wherein at least a portion of the floor of the slide-out glides along the vertical movement member during retraction so as to lift the slide-out housing to the second level and glides along the vertical movement member during deployment so as to lower the slide-out housing to the third level.

2. The vehicle of claim 1, wherein the third level is co-planar with the first level.

3. The vehicle of claim 1, further comprising a chassis and a set of wheels to permit rolling movement of the recreational vehicle over the ground.

4. The vehicle of claim 3, wherein the recreational vehicle comprises a motorhome.

5. The vehicle of claim 1, further comprising a deployment and retraction mechanism that moves the slide-out housing between the retracted and deployed positions.

6. The vehicle of claim 1, wherein the vertical movement member comprises a plurality of vertical movement members.

7. The vehicle of claim 1, wherein the recessed region comprises a substantially rectangular contour.

8. The vehicle of claim 1, wherein the vertical movement member is contoured to be positioned in the recessed region.

9. The vehicle of claim 1, wherein the vertical movement member comprises a substantially rectangular contour.

10. The vehicle of claim 1, wherein the floor of the slide-out comprises an inclined component that is positioned so as to contact the vertical movement member during retraction and deployment of the slide-out.

11. The vehicle of claim 1, wherein the vertical movement member comprises a material selected to support the slide-out during retraction and deployment.

12. A recreational vehicle comprising:
a main housing that defines an interior living space, wherein the main housing includes a floor having a surface;
one or more slide-out that provides added interior living space when extended; and
a surface floor protector having a first orientation and a second orientation, wherein the first orientation of the surface floor protector comprises the surface floor protector being interposed between the bottom portion of the slide-out and the floor surface to protect the floor surface from damage by the bottom of the of the slide-out, and wherein the second orientation of the surface floor protector comprises the surface floor protector being swung away from the floor surface as the slide-out moves outward to its extended configuration.

* * * * *